(12) United States Patent
Mostafa

(10) Patent No.: US 8,682,849 B2
(45) Date of Patent: Mar. 25, 2014

(54) SYSTEM AND METHOD FOR IMPLEMENTING PERSONALIZATION AND MAPPING IN A NETWORK-BASED ADDRESS BOOK

(75) Inventor: Miraj Mostafa, Tampere (FI)

(73) Assignee: Nokia Corporation, Espoo (FI)

( * ) Notice: Subject to any disclaimer, the term of this patent is extended or adjusted under 35 U.S.C. 154(b) by 375 days.

(21) Appl. No.: 12/540,551

(22) Filed: Aug. 13, 2009

(65) Prior Publication Data

US 2010/0088276 A1    Apr. 8, 2010

Related U.S. Application Data

(60) Provisional application No. 61/088,661, filed on Aug. 13, 2008.

(51) Int. Cl.
*G06F 17/30*    (2006.01)

(52) U.S. Cl.
USPC ......................................................... 707/636

(58) Field of Classification Search
USPC ................................ 707/636, 999.201, 999.01
See application file for complete search history.

(56) References Cited

U.S. PATENT DOCUMENTS

| | | | |
|---|---|---|---|
| 2002/0116396 A1 | 8/2002 | Somers et al. | |
| 2004/0121765 A1* | 6/2004 | Idnani et al. | 455/422.1 |
| 2006/0135142 A1* | 6/2006 | Repka | 455/418 |
| 2006/0229063 A1* | 10/2006 | Koch | 455/414.1 |
| 2008/0065758 A1* | 3/2008 | Narayanaswami | 709/224 |
| 2009/0150488 A1* | 6/2009 | Martin-Cocher et al. | 709/204 |

FOREIGN PATENT DOCUMENTS

| | | |
|---|---|---|
| WO | 2006-125183 A2 | 11/2006 |
| WO | 2008-090556 A1 | 7/2008 |

OTHER PUBLICATIONS

International Search Report and Written Opinion, received in correspnding PCT Application No. PCT/IB2009/006564, issued by Swedish Patent Office (ISA), Oct. 30, 2009, 13 pages.

* cited by examiner

*Primary Examiner* — Etienne LeRoux
(74) *Attorney, Agent, or Firm* — Alston & Bird LLP

(57) ABSTRACT

A system and method for implementing personalization, mapping and status management in a network-based address book. A subscription function (SF) subscribes to personal contact information of specific users to personal contact card (PCC) servers and receives updates to the contact information of the subscribed user(s). The SF retrieves the personalization rule document of subscribing user and applies personalization rules to the updated contact information. The personalized contact information is handed over to a data synchronization (DS) client so that the DS client may synchronize the information with the address book of the subscribing user in a converged address book (CAB) server. The personalized contact information of the subscribed contacts is propagated to other devices or web portals. A new or existing attribute/parameter may be provided and/or used for each contact entry for use in uniquely identifying each contact. The SF may maintain a document outlining the status of entries in the address book. All of the contact entries (with all or a subset of contact information) of an address book may be synchronized between the DS client coupled with the SF and a CAB server at the beginning and later when there is a change in the address book.

20 Claims, 7 Drawing Sheets

SYSTEM AND METHOD FOR IMPLEMENTING PERSONALIZATION AND MAPPING IN A NETWORK-BASED ADDRESS BOOK

RELATED APPLICATION

This application claims priority to U.S. Application No. 61/088,661 filed Aug. 13, 2008, which is hereby incorporated herein by reference.

FIELD OF THE INVENTION

The present invention relates generally to the management of electronic address books. More particularly, various embodiments of the present invention relate to the personalization, synchronization and mapping of information in network-based address books, and the obtaining of status information in such address books.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Various names are used to refer to electronic address books, and these names include phonebooks, contacts, etc. It is a common practice to update an address book for a variety of reasons. For example, a user may desire to replace certain contact information with suitable texts that are interest to him or her. For instance, a user may wish to have his or her father referred to as "dad" whenever this person's contact information is exhibited. Similarly, a person may wish to have his or her spouse referred to as "honey" whenever this information is exhibited. Other possible desired adjustments may involve the use of a person's nickname (e.g., using "Nick" for "Nicholas" or "Susie" for "Susan") or the modification of a particular attribute, such as changing the term "telephone" to "fone" or "phone". This type of adjusting of information is often referred to as the "personalization" or "customization" of contact information, and each of these actions to be taken are referred to herein as a "personalization rule" or "customization rule."

A particular contact within an address book may also have related information that is beyond the scope of a conventional address book. This information may include, for example, Presence information, user settings, customization information, etc. In such cases, a mapping is required between pieces of information that concern the same contact (i.e., the same user) so that this information can be consistently merged within a device's user interface and/or can be handled properly by an application, by a client in a device, and/or by an entity within a network.

A Network Address Book (NAB) is an address book stored in a network. The Open Mobile Alliance (OMA) is in the process of standardizing an NAB in terms of a Converged Address Book (CAB). With such standardization, a CAB may define a network repository for the contact information of a user, referred to as a Personal Contact Card (PCC). A user is expected to maintain and update his/her PCC in the network. The repository of the PCC's of various users is referred to herein as a PCC server.

In the CAB standardization process, requirements have been promulgated for the personalization contact information in a manner by which information which has been personalized by a user can be harmonized across all of the user's devices. The CAB standardization also requires the integration of Presence information in an address book in order to improve the overall user experience, requiring a suitable mechanism for merging/mapping contact information from an address book and Presence information that comes from a different source. Personalization rule and user settings, maintained by a user or a service provider, must also correctly map to the contact information of a specific contact when so needed. Personalization rules or user settings may also have default values, with not requirement that they be maintained by anyone.

SUMMARY OF THE INVENTION

Various embodiments provide a system and method for implementing personalization and mapping in a network-based address book. According to various embodiments, a user preference & policy (UPP) server includes a tree for defining personalization rules for each user, or the personalization rules can be stored in another server. A subscription function (SF) subscribes for personal contact information of specific users to the PCC server and, in response to the subscriptions, receives updates to the contact information of the subscribed user(s) via notifications. Upon receiving updates, the SF retrieves the personalization rule document of the subscribing user from the UPP server (or wherever else the personalization rule document is stored) and applies the underlying rule to the updated contact information. Upon applying the personalization rules, the SF hands over the personalized contact information to a data synchronization (DS) client so that the DS client may synchronize the information with the address book of the subscribing user in the CAB Server. The personalized contact information of subscribed contacts is then propagated to other device or web portals, based on the synchronization of the address book between the CAB server and the CAB client.

Various embodiments also provide for a field, attribute or parameter which may be provided for each contact entry in an address book for use in uniquely identifying the contact. The SF may maintain a document outlining the status of entries in the address book. The entire address book may be synchronized between the DS client coupled with the SF and a CAB server at the beginning of using the service. Synchronization may also occur at a later time, when there is a change in the address book. With such synchronizations, the SF has the right information about all of the contact entries of the address book in order to manage a document outlining the status of the entries, as mentioned above. In some situations, the synchronization may only apply to a required subset of contact information of all of the contact entries (e.g., a unique identity of each contact).

As a result of the implementation of various embodiments, a relatively simple mechanism is provided for the management of personalization rules. Additionally, the various embodiments discussed herein provide a personalization and mapping arrangement that is not device-specific, thereby enabling the personalization of information to more easily occur across devices.

These and other advantages and features of various embodiments of the present invention, together with the organization and manner of operation thereof, will become appar-

BRIEF DESCRIPTION OF THE DRAWINGS

Example embodiments of the present invention are described by referring to the attached drawings, in which.

DETAILED DESCRIPTION OF VARIOUS EMBODIMENTS

Figure 1:
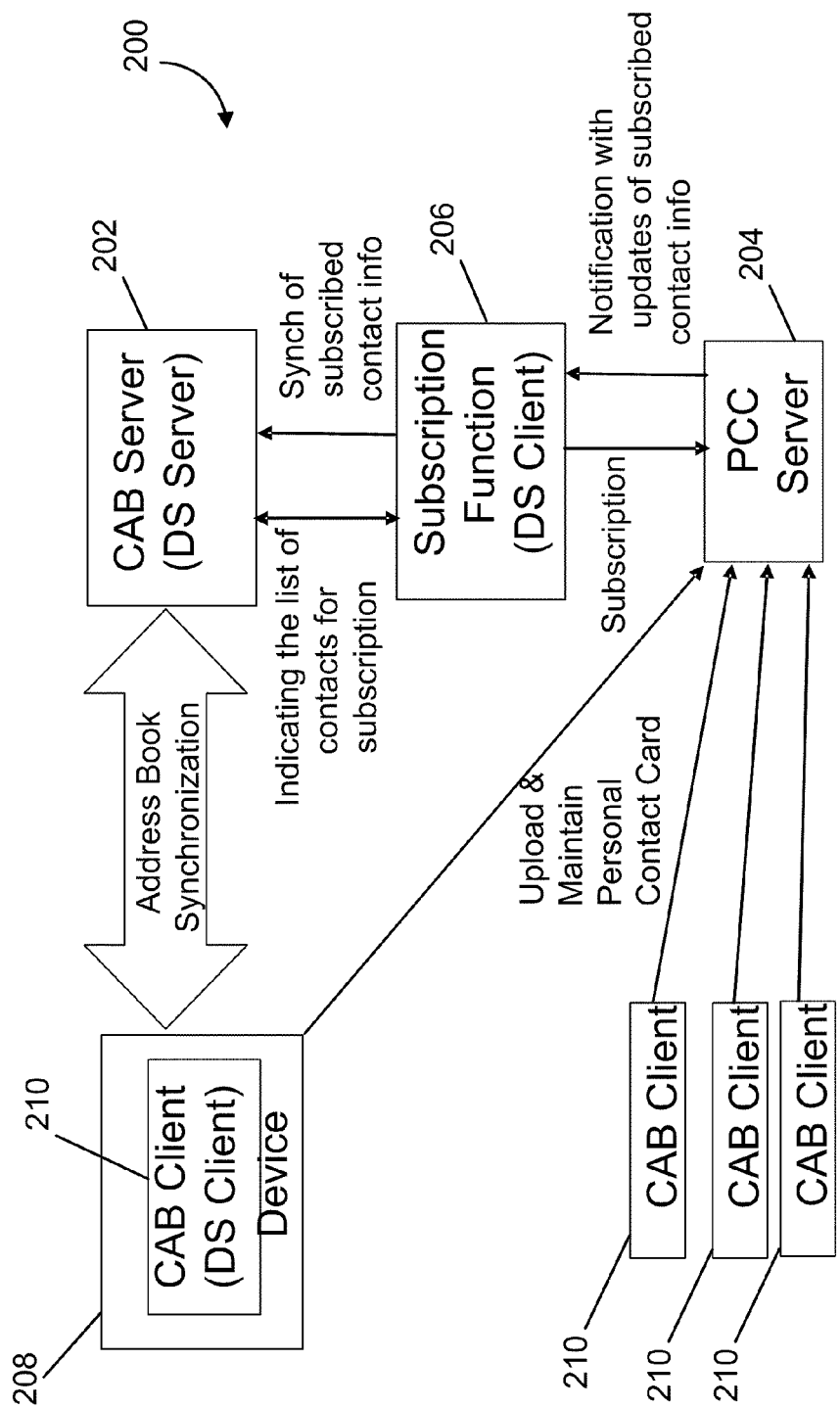
FIG. 1 is a schematic illustration of involved entities and the information flow for the automatic updating of an address book in an exemplary architecture diagram according to various embodiments of the present invention.

As discussed previously, various requirements have been promulgated for the personalization of address book information. When a personalization rule is implemented by a user, this rule must be harmonized across all of the devices owned by the user. Additionally, this personalization rule must also be similarly harmonized, for example, in the user's Web-based address book, if he or she has such a book. For these reasons, a strictly "local" solution for implementing a particular personalization rule within a device may not be sufficient in many instances.

To date, although various personalization mechanisms have been previously proposed and/or developed, these mechanisms have been provided locally within a device or within a Web portal. As a result, when these mechanisms are implemented, there is no impact on any other device or portal for the same user. For example, it is possible for a user to have two different electronic devices and web portal, all of which he or she may wish to use to access address book information. In the conventional personalization mechanisms described above, a user would have to enter a personalization rule in each device and the web portal separately in order for the rule to be implemented across each of the systems, i.e., for the address book to be harmonized across all three systems. These local solutions therefore fall short of the promulgated requirements, which find device or portal-based solutions insufficient.

In addition to the above, it is important to have a consistent mapping between contact information and Presence Information for a particular user/contact. Without such a consistent mapping, Presence Information may not be properly merged into an address book user interface, as is required by the CAB. The CAB also requires a similar mapping to apply to user settings and personalization of the contact information for a specific user/contact.

Although conventional systems have been developed for the mapping of information of the same contact/user from different sources, these solutions are typically "closed" solutions within a device. As a result, these solutions often will not work properly in open environment across devices or portals. For example, the name of a particular contact/user may not be globally unique, thereby resulting in multiple contacts/users with the same name across devices and/or portals. Moreover, the use of different mechanisms to address uniqueness-related issues is not suitable for open, i.e., cross-device or portal solutions.

Various embodiments of the present invention provide an "open" solution for addressing various issues discussed above concerning the harmonization and mapping of personalization rules across devices and/or portals. According to various embodiments, personalization rules for each user are stored and maintained in a User Preference & Policy (UPP) server or in another suitable server. A UPP server may be based, for example, on the OMA eXtensible markup language (XML) document management (XDM). In this arrangement, personalization information may be stored in XML format and may be accessed by XML Configuration Access Protocol (XCAP) over Hypertext Transfer Protocol (HTTP).

FIG. 1 is a schematic illustration of involved entities and the information flow for the automatic updating of an address book in an exemplary architecture diagram according to various embodiments. An address book update system 200 includes a CAB server 202 configured to function as a server for the address book of a user. In one embodiment, and as illustrated in parentheses in FIG. 1, the CAB server is an OMA data synchronization (DS) server. A CAB client 210 is provided in a user device 208 to maintain the address book of the user in the CAB server 202. In the illustrated embodiment, the CAB client also includes the functionality of a DS client. As exemplarily illustrated in FIG. 1, the address book update system 200 may be configured to accommodate virtually any number of CAB clients.

An interface may be provided between the CAB client 210 and the CAB server 202. This interface may be configured to support the data synchronization between the CAB client 210 and the CAB server 202. The CAB client 210 includes the functionality of the DS client for synchronization. Similarly, the CAB server 202 includes the functionality of the DS server for the same purpose. The interface may support functions including, but not limited to (1) the data synchronization protocol of the CAB; (2) CAB management functions such as the adding, deleting and updating of the CAB; and (3) the mutual authentication with the CAB client 210. A PCC server 204 is provided to function as a repository of the PCC's of various users.

In accordance with various embodiments, a subscription function (SF) 206 is provided between the CAB server (DS server) 202 and the PCC server 204. In embodiment depicted in FIG. 1, the SF 206 is configured to function as a DS client. In accordance with various embodiments, the DS client and the SF 206 may belong to the same logical entity. Thus, the DS client may be coupled with the SF 206. It should be noted that, while the DS client and the SF 206 are illustrated as a logical entity in FIG. 1, the DS client and the SF 206 may be implemented as separated physical entities in various embodiments. FIG. 1 is simplified to show only the home domain. In practice, however, PCC servers of remote domains can be connected to the home domain so that subscription and search requests are provided to the PCC servers of the remote domain(s).

Figure 2:
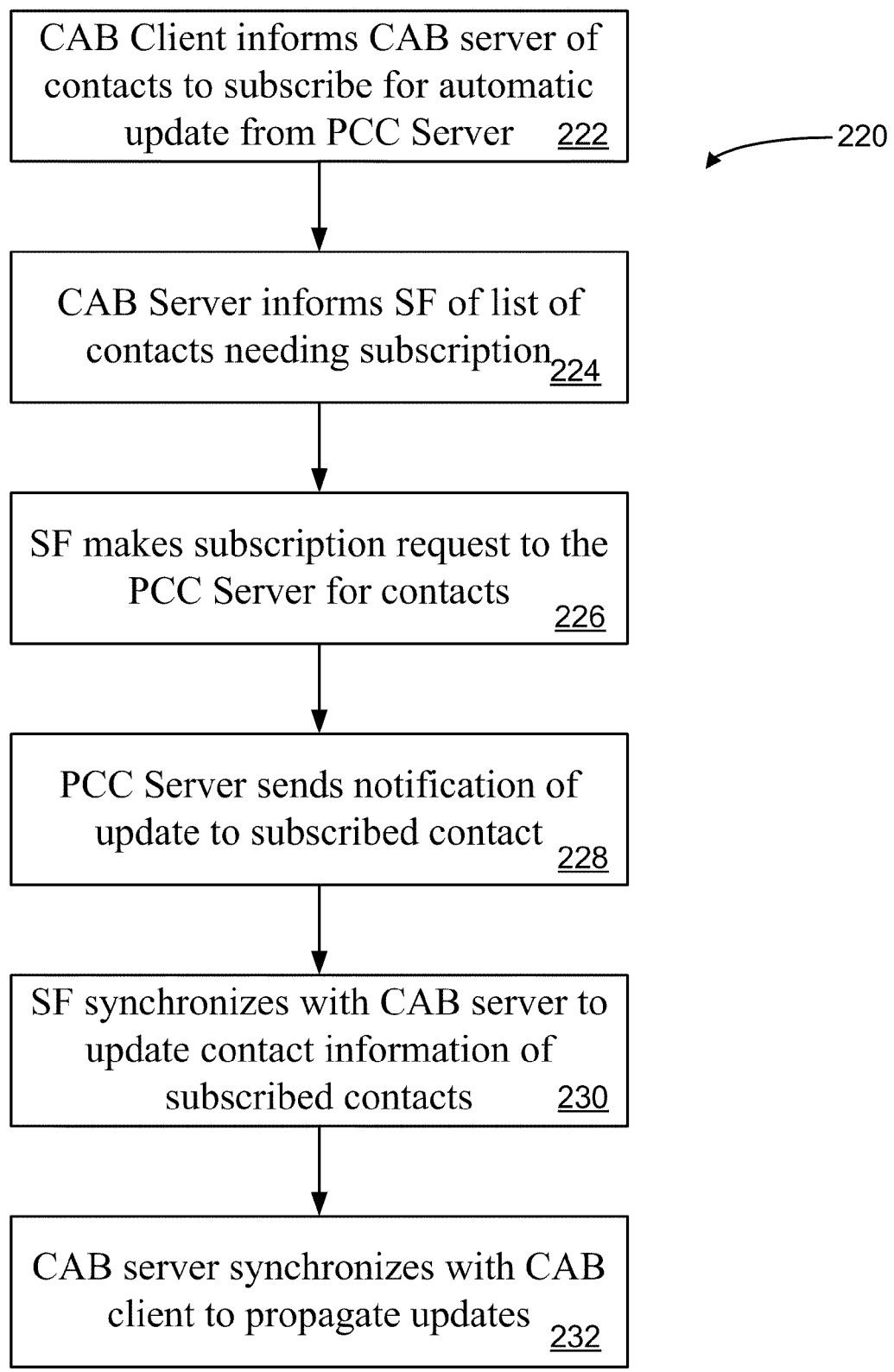
FIG. 2 is a flow chart showing a process by which an address book may be updated according to one exemplary embodiment.

According to various embodiments, synchronization of an address book is performed between the CAB client 210 and the CAB server 202. FIG. 2 is a flowchart illustrating an exemplary address book update process using the system depicted in FIG. 1. In the exemplary process 220, the CAB client 210 informs the CAB server 202 about the contacts for whom the CAB server 202 should subscribe for automatic update from the PCC server 204 (block 222 of FIG. 2). As used herein, a "contact" may refer to a person or an entity having contact information. In various embodiments, this is achieved by providing a new flag, attribute, parameter or other feature within e.g. vCard, which is widely used as the data format of address book. The value of the flag, attribute, parameter or other feature may indicate whether the corresponding contact should be subscribed.

At 224 in FIG. 2, the CAB server 202 then informs the SF 206 (or the DS client within the SF 206) about the list of contacts that need subscription. In one embodiment, the filtering of OMA DS is implemented so that the CAB server (or DS server) 202 creates a filtering document including the contact entries requiring subscription. Upon creating such filtering document, the CAB server 202 may notify the DS client for synchronization based on the solution defined by the OMA DS. Upon receiving the notification, the DS client (which may be coupled with the SF 206) starts synchronizing with the CAB server 202 and receives the contact entries for subscription. As an alternative to 222 and 224 discussed above, it is also possible for a user to maintain a list of contacts that need subscription in a server (e.g., the UPP server), and the SF 206 retrieves the list from the server before subscription. The list may be stored as an XML document and accessed using XCAP or other suitable mechanisms. Even if this alternative approach is followed, the CAB server 202 may keep the SF 206 up to date with the required subset of contact information of all of the contact entries through synchronization. The subset includes at least the unique identity field/attribute of each contact and other necessary information of each contact for managing the document with the status information of each contact.

At 226, the DS client hands over the list of contact entries to the SF 206, and the SF 206 makes subscription request for the entries to the PCC server 204. In this regard, the SF 206 may use the session initiation protocol (SIP) subscription mechanism. In one embodiment, the PCC server 204 is based on OMA XDM.

At 228 in FIG. 2, upon receiving the subscription request, the PCC server 204 follows the SIP subscription mechanism and sends notification for each update of the subscribed contact entries. The SF may then hand over the updated contact information to the coupled DS client, and the DS client may synchronize with the CAB server 202 at 230 in order to update the contact information of the subscribed contacts with the address book in CAB Server. The synchronization may be based on OMA DS. The updates are propagated to CAB client later, when the address book is synchronized between the CAB client and CAB server, again potentially based on OMA DS. At 232 of FIG. 2, the CAB server synchronizes with the CAB client, and updates of the contact information are propagated to the local address book in the device.

Figure 3:
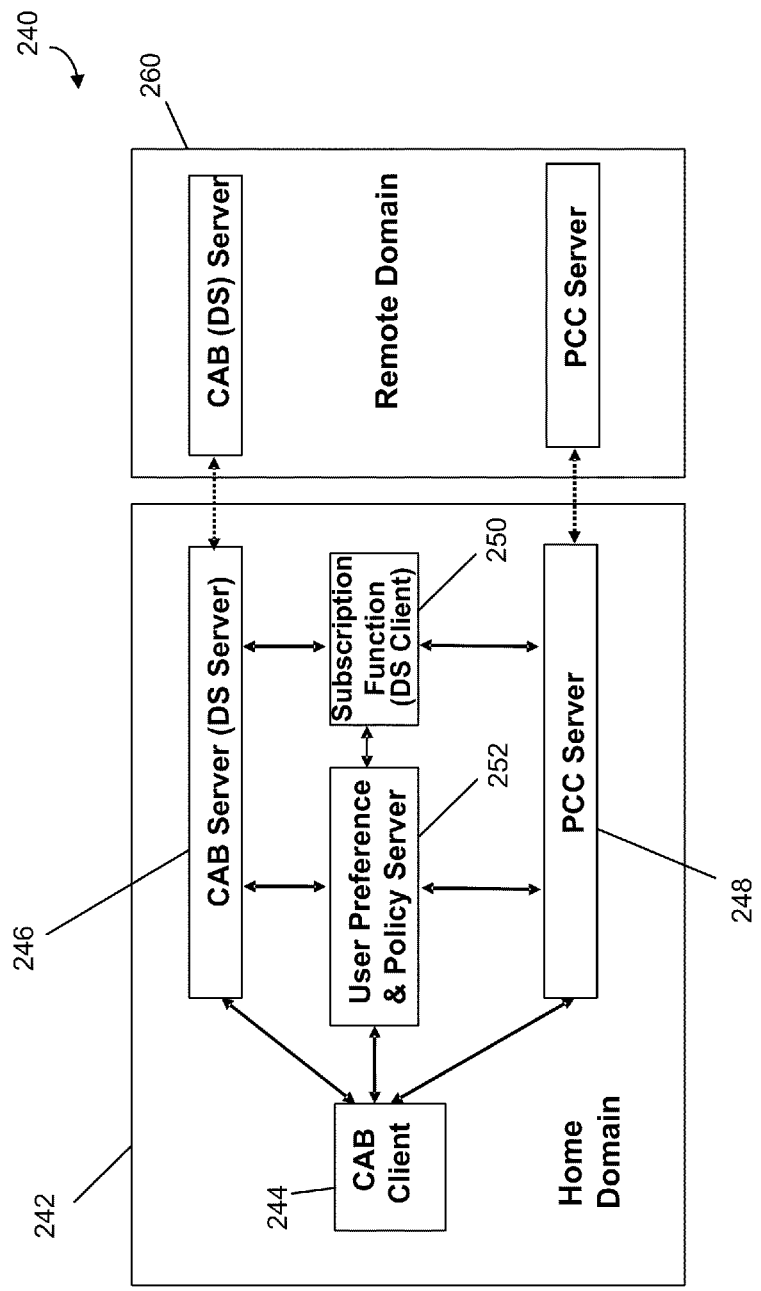
FIG. 3 is a schematic illustration of a high-level architecture for an OMA CAB.

FIG. 3 is a schematic illustration of a high-level architecture, shown generally at 240, for an OMA CAB according to various embodiments. As depicted in FIG. 3, a home domain 242 includes a CAB client 244 (including DS client functionality), a CAB server 246 (including DS server functionality), a PCC server 248, and an SF with a DS client 250. A UPP server 252 is configured to communicate with the CAB client 244, the CAB server 246, the PCC server 248, and the SF with a DS client 250. The UPP server 252 is configured to store authorization rules for subscription and search. Thus, in addition to maintaining a PCC, a user may also maintain authorization rules for subscribing and searching his or her Personal Contact Card. Further, the UPP server 252 may also store user preferences/settings, such as the contact information that the SF should subscribe for each contact. Thus, in one embodiment, upon receiving a list of contacts that the SF needs to subscribe, the SF retrieves the list of desired contact information from UPP server 252 and subscribes only for the desired information to the PCC server 248.

In the embodiment illustrated in FIG. 3, the architecture 240 further includes a remote domain 260. It should be noted that, although one remote domain 260 is depicted in FIG. 3, multiple home domains 260 are capable of being connected to the home domain 242 based upon agreement among the operators and/or service providers. When the SF makes a subscription request, it is possible that all of the subscribed users do not belong to the home domain. For users belonging to one or more remote domains 260, the SF may forward the subscription request to the PCC server 248 of the remote domain 260. The remote domain 260 may also facilitate searching. In this regard, search requests by a user may be forwarded to one or more remote domains 260.

According to various embodiments of the present invention, the UPP server 252 is based upon XDM (XML document management) and includes a tree for each user to define the personalization rules. According to these embodiments and referring again to FIG. 3, an SF 250 subscribes for personal contact information of specific users to the PCC server 248 and, in response to the subscriptions, receives updates to the contact information of the subscribed user(s) via notifications. The PCC server 248 of the home domain 242 or any related entity (e.g., a proxy/server that handles subscriptions (not shown in FIG. 3)) may also forward the subscription request to the PCC servers 248 of connected remote domains 260, if any subscribed contacts belong to remote domains 260 and there exists a service agreement between the home domain 242 and remote domain 260. In response, the PCC servers 248 of the remote domains 260 provide updates of subscribed users, and the all the updates are aggregated in the home domain 242 by the PCC server 248 of the home domain 242 or any related entity such as the proxy/server discussed above. The aggregated updates are sent to the SF 250.

Upon receiving updates, the SF 250 retrieves the personalization rule document of the subscribing user from the UPP server 252 and applies the underlying rule(s) contained therein to the updated contact information. For example, if the personalization rule document includes a rule that the specific user is to be referred to as "Dad," then this rule is applied to the updated contact information. Upon applying the personalization rules, the SF 250 hands over the personalized contact information to the DS Client, which may be coupled with the SF 250 in various embodiments, so that the DS client may synchronize the information with the address book of the subscribing user in the CAB server 246, which has the functionality of an OMA DS server. The personalized contact information of subscribed contacts is then propagated to other devices or web portals based on the synchronization of the address book between the CAB server 246 and the CAB client 244. It should be noted that the CAB client(s) 244 in device or web portals have the functionality of an OMA DS client. In this particular embodiment, the UPP server 252 is used to store the personalization rule(s). However, any suitable server can be used to store the personalization rule(s).

Figure 4:
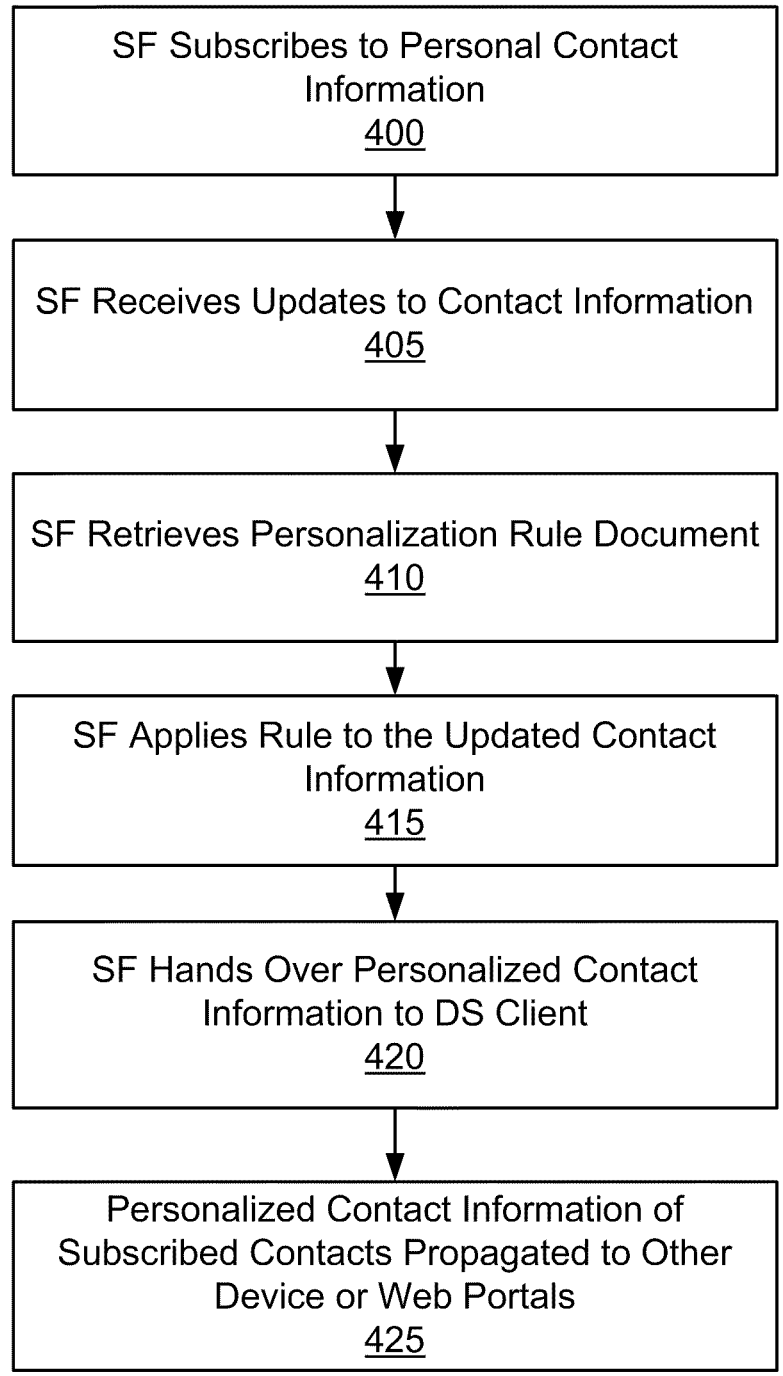
FIG. 4 is a flow chart showing a process by which various embodiments of the present invention may be implemented.

FIG. 4 is a flow chart showing a process by which various embodiments of the present invention may be implemented. At 400 in FIG. 4, a SF 250 subscribes to personal contact information of specific users/contacts the PCC server 248. In response to these subscriptions, at 405 the SF 250 receives updates to the contact information of the subscribed user(s) via notifications. Upon receiving updates, at 410 the SF 250 retrieves the personalization rule document of the subscribing user from the PCC server 248 and, at 415, applies the underlying rule(s) from the personalization rule document to the updated contact information. At 420, the SF 250 hands over the personalized contact information to the DS Client, which may coupled with the SF 250, so that the DS client may synchronize the information with the address book of the subscribing user in the CAB Server 246, which has the functionality of an OMA DS server. The personalized contact information of subscribed contacts is then propagated at 425 to other device or web portals, based on the synchronization of the address book between the CAB server 246 and the CAB client 244.

In additional set of embodiments, the entire address book (with all or a subset of the contact information for all of the contact entries) is synchronized between the DS client, coupled with the SF, and the CAB server at the beginning of a session. In these embodiments, the synchronization at the beginning of using the service and later when there is a change in the address book. In these embodiments, the synchronization is not limited to only the subscribed-to entries, but instead covers all of the entries within the address book. In particular embodiments, a certain level of filtering may still be permitted. However, the filter does not apply to entire contact entries, instead apply to particular contact details within entries.

Various embodiments also provide for the addition of a new field, attribute or parameter for each contact entry in an address book for use in uniquely identifying the contact. In one particular embodiment, an electronic business card, i.e., a vCard, has a new attribute for identifying a user's identity. In certain embodiments, the parameter may be entitled "ui" for "user identity." The value of the parameter may comprise virtually any unique identifier in various embodiments. For example, an XML user identifier (XUI) (OMA XDM), e-mail address, or telephone number in the international format may be used as the value. Here, XUI is simply the session initiation protocol (SIP) or telephone (TEL) uniform resource identifier (URI) of the user, both of which are globally unique. The Presence Information of any user also includes the same XUI under the "entity" attribute of the <presence> element and within resource list meta-information (RLMI) for a list subscription. Therefore, contact information and Presence information may be merged based on the user's identity. Additionally, when a user defines personalization rules or any settings for a specific contact, the document in the UPP server may also include the XUI within the rule. This permits the SF to map the rule and the corresponding contact entry.

As an alternative to the above, any existing attribute of a vCard or any other format can be used to uniquely identify a user/contact. If a XUI is used, the attribute that carries SIP/TEL URI may be used to uniquely identify a user. If an e-mail address is used, the corresponding attribute (i.e. the EMAIL attribute of vCard) is used to uniquely identify a user. However, it is important for there to exist a global agreement/understanding/standardization about which attribute is to be used to uniquely identify a user/contact.

The unique identification of any contact entry aids in independently providing and maintaining the status and statistics of address book information, e.g., a user's subscription status (e.g., subscribed, pending/waiting, failed, etc.), whether a user has personal contact information in a PCC server, whether a user is a legacy user, who is the service provider of a contact in an address book, the source of contact information, etc. For example, if the UCC or any other server maintains the status of the contacts in a user's address book, the user identity may be used to refer any contact in address book. Therefore, if the status is provided to a device of the user, the device, i.e., a CAB client, may map the status information with the corresponding contact entry within the address book.

In terms of filling in a user identification parameter, it is possible that a user or a CAB client may not be aware of the value when the contact entry is initially created within the address book. In this situation, the client may use any locally unique identifier as the value of the proper parameter/attribute. Later, if the corresponding contact is subscribed to by the SF on behalf of the user, the SF may then obtain the XUI (or whatever is used to uniquely identify the contact/user), at which point the SF replaces the local identity with the received XUI. The received XUI may then be propagated to the CAB server and the CAB client through synchronization. The CAB client may use this identity in any XDM document (e.g., personalization rule(s), user settings, status information, etc.) in the UCC server in place of the previously used local identity.

In addition to the above, an additional requirement has been promulgated through the CAB standardization process that certain status information of contact entries within an address book be maintained and made available to individual users. As used herein, "status information" is intended to refer to information such as the status of the subscription for an individual entry—whether the subscription was successful, pending, not allowed or failed, whether the entry does not have a PCC in the PCC server (i.e., if the entry is not a CAB user), the source of the contact information of a contact/user, the service provider of the contact/user, etc. Various embodiments address this issue by having the SF generate and maintain a document that outlines the status of the entries in an address book. The SF may generate this document using the information it already has in its possession concerning the status of each entry in the address book. In particular embodiments, the document is XML-based, and the document may be stored in any XDMS server, e.g., a UPP server. In this arrangement, a user can retrieve the document using XCAP or another mechanism. The user can subscribe to it using, e.g., SIP, so that he or she is notified with each change that is made in the document.

The following are non-limiting examples of various embodiments of the present invention. In various embodiments, a method, computer program product, system and apparatus is provided for updating personalization rules for a converged address book is provided. A subscription function subscribes for personal contact information of at least one specific user to a personal contact card server. In response to the subscribing to personal contact information, updated personal contact information of the at least one specific user is received. Upon receiving updates, a personalization rule document including at least one personalization rule of the at least one specific user is obtained from the user preference & policy server. The at least one personalization rule is applied to the updated personalized contact information. The updated personalized contact information is provided to a data synchronization client, thereby allowing the data synchronization client to synchronize the updated personalized contact information with an address book of at least one subscribing user in a converged address book server. The subscription function may be coupled with the data synchronization client. The updated personalized contact information of the at least one specific user may then be propagated to other devices and/or web portals through further synchronization. The user preference and policy server may include a tree for each user to define personalization rules.

Various embodiments also provide for a method, computer program product, system and apparatus for harmonizing a network-based address book across multiple devices and/or portals. At least one globally-defined personalization rule is stored on a server. The at least one globally-defined personalization rule relates to at least one contact in the network-based address book. The at least one personalization rule is applied across multiple devices and/or portals. As a result of the application of the personalization rule across multiple devices and/or portals, a common harmonized view of personalized contact information is displayed on each of the multiple devices and/or portals when accessed by a user.

Various embodiments also provide for a method, computer program product, system and apparatus for maintaining contact entries in an address book. A parameter/attribute is assigned to a specific user. The parameter/attribute is used to uniquely identify the specific user during the use and/or manipulation of the address book. The parameter/attribute may comprise a eXtensible markup language user identifier, or another suitable value such as an e-mail address. The eXtensible markup language user identifier may comprise the subscription initiation protocol uniform resource indicator of the at least one specific user. The eXtensible markup language user identifier may comprise the telephone uniform resource indicator of the at least one specific user.

Various embodiments also provide for a method, computer program product, system and apparatus for maintaining status information in an address book. A document is generated that includes the status of a plurality of entries in the address book. Changes in the status for the plurality of entries are maintained in the document. The documents may be maintained by the subscription function. The document may be eXtensible markup language-based, and the document may be stored in an eXtensible markup language document management server such as a user preference & policy server.

Various embodiments also provide for a method, computer program product, system and apparatus for synchronization contact information in an address book. A data synchronization client and a converged address book are synchronized at the beginning of using the service such that all of the contact entries (with all or a subset of contact information) in the address book are synchronized, regardless of whether all entries are subscribed to. The data synchronization client may be coupled to a subscription function. During the synchronization, details within individual contact entries may be filtered. No filtering is applied to filter out entire contact entries.

Figure 5:
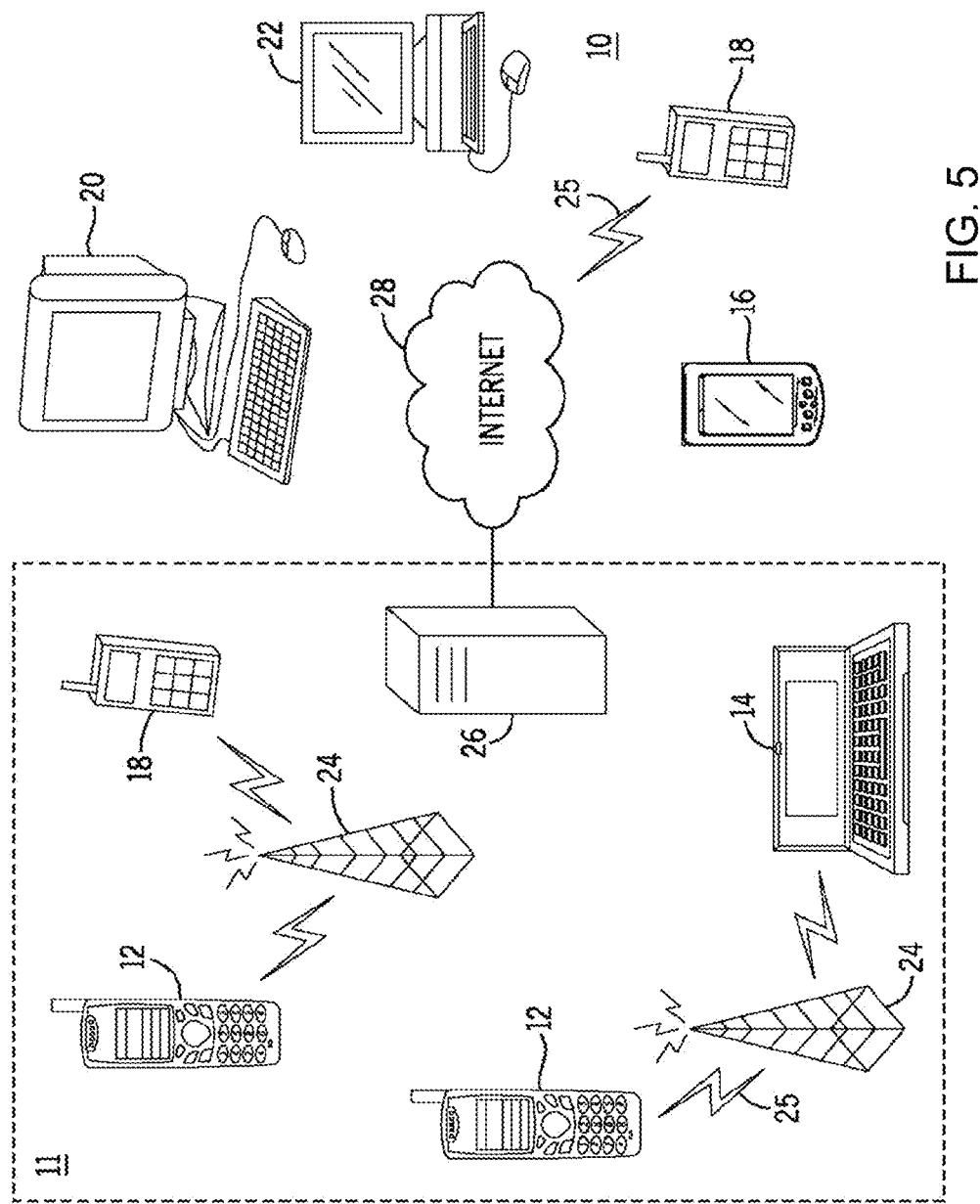
FIG. 5 is an overview diagram of a system within which various embodiments of the present invention may be implemented.

FIG. 5 shows a system 10 in which various embodiments of the present invention may be utilized, comprising multiple communication devices that may communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 5 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The example communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 6:
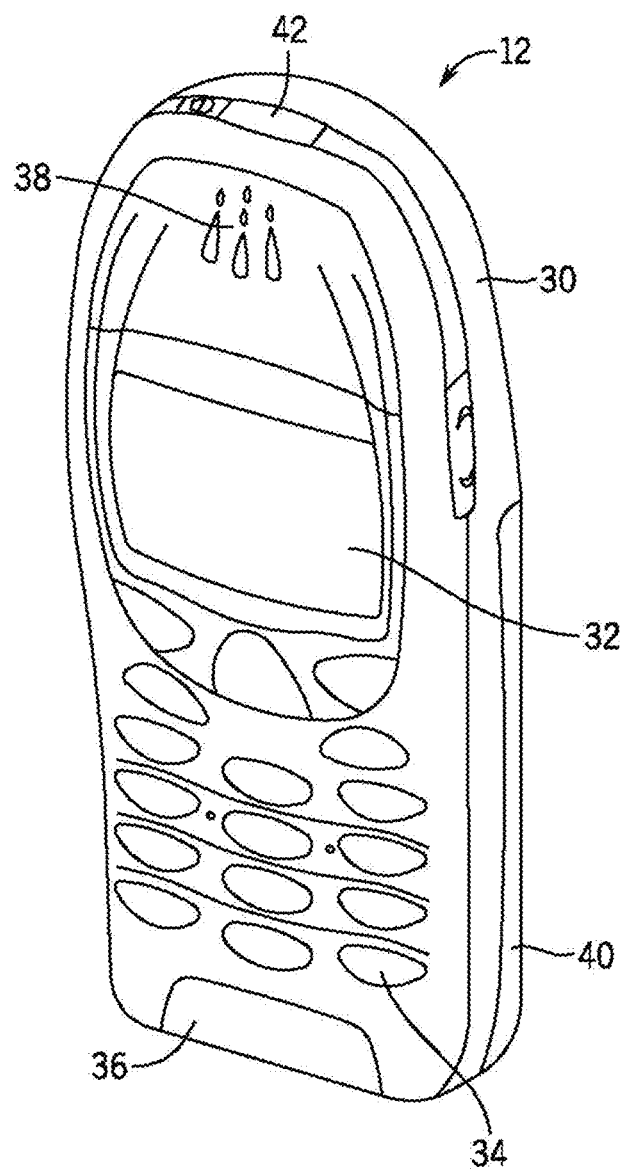
FIG. 6 illustrates a perspective view of an example electronic device which may be utilized in accordance with the various embodiments of the present invention.
Figure 7:
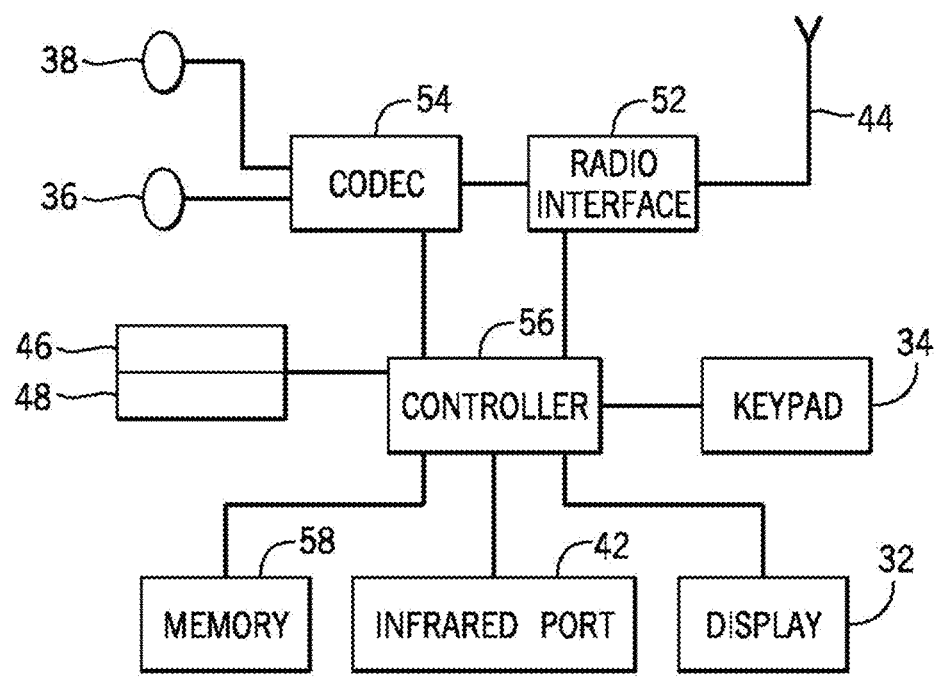
FIG. 7 is a schematic representation of the circuitry which may be included in the electronic device of FIG. 6.

FIGS. 6 and 7 show one representative electronic device 28 which may be used as a network node in accordance to the various embodiments of the present invention. It should be understood, however, that the scope of the present invention is not intended to be limited to one particular type of device. The electronic device 28 of FIGS. 6 and 7 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. The above described components enable the electronic device 28 to send/receive various messages to/from other devices that may reside on a network in accordance with the various embodiments of the present invention. Individual circuits and elements are all of a type well known in the art, for example in the Nokia range of mobile telephones.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments may be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
receiving an indication of list of contacts in an address book to receive an automatic update;
submitting a subscription request for the contacts;
receiving updates for contact information for the subscribed contacts;
obtaining a personalization rule document, the personalization rule document including at least one personalization rule;
applying the at least one personalization rule to the updated contact information for the subscribed contacts to produce personalized updated contact information from the updated contact information; and
synchronizing the updated contact information with the at least one personalization rule applied with the address book on a first device.

2. The method of claim 1, further comprising:
propagating the updated contact information to other devices.

3. The method of claim 1, wherein the receiving an indication includes receiving a list of contact entries.

4. The method of claim 3, wherein the list of contact entries is in the form of an XML document.

5. The method of claim 1, wherein the submitting a subscription request includes using a session initiation protocol subscription mechanism.

6. The method of claim 1, wherein the receiving a notification is in response to an update to a contact share document.

7. The method of claim 1, wherein the receiving updates for contact information includes receiving updates from a personal contact card server or a network repository of address book.

8. An apparatus, comprising:
a processor; and
a memory unit communicatively connected to the processor and including: computer code for receiving an indication of list of contacts in an address book to receive an automatic update;
computer code for submitting a subscription request for the contacts;
computer code for receiving updates for contact information for the subscribed contacts;
computer code for obtaining a personalization rule document, the personalization rule document including at least one personalization rule;
computer code for applying the at least one personalization rule to the updated contact information for the subscribed contacts to produce personalized updated contact information from the updated contact information; and
computer code for synchronizing the updated contact information with the at least one personalization rule applied with the address book on a first device.

9. The apparatus of claim 8, wherein the memory unit further includes:
computer code for propagating the updated contact information to other devices.

10. The apparatus of claim 8, wherein the computer code for receiving an indication includes computer code for receiving a list of contact entries.

11. The apparatus of claim 10, wherein the list of contact entries is in the form of an XML document.

12. The apparatus of claim 8, wherein the computer code for submitting a subscription request includes computer code for using a session initiation protocol subscription mechanism.

13. The apparatus of claim 8, wherein the computer code for receiving a notification is effected in response to an update to a contact share document.

14. The apparatus of claim 8, wherein the computer code for receiving updates for contact information includes computer code for receiving updates from a personal contact card server or a network repository of address book.

15. A computer program product, embodied on a non-transitory computer-readable storage medium, comprising:
computer code for receiving an indication of list of contacts in an address book to receive an automatic update;
computer code for submitting a subscription request for the contacts;
computer code for receiving updates for contact information for the subscribed contacts;
computer code for obtaining a personalization rule document, the personalization rule document including at least one personalization rule;
computer code for applying the at least one personalization rule to the updated contact information for the subscribed contacts to produce personalized updated contact information from the updated contact information; and
computer code for synchronizing the updated contact information with the at least one personalization rule applied with the address book on a first device.

16. The computer program product of claim 15, further comprising:
computer code for propagating the updated contact information to other devices.

17. The computer program product of claim 15, wherein the computer code for receiving an indication includes computer code for receiving a list of contact entries.

18. The computer program product of claim 15, wherein the computer code for submitting a subscription request includes computer code for using a session initiation protocol subscription mechanism.

19. The computer program product of claim 15, wherein the computer code for receiving a notification is effected in response to an update to a contact share document.

20. The computer program product of claim 15, wherein the computer code for receiving updates for contact information includes computer code for receiving updates from a personal contact card server or a network repository of address book.

\* \* \* \* \*